United States Patent [19]
Godard et al.

[11] Patent Number: 6,014,401
[45] Date of Patent: Jan. 11, 2000

[54] DEVICE FOR CONTROLLING A LASER SOURCE WITH MULTIPLE LASER UNITS FOR THE ENERGY AND SPATIAL OPTIMIZATION OF A LASER SURFACE TREATMENT

[75] Inventors: Bruno Godard, Les Ulis; Marc Stehle, Meudon, both of France

[73] Assignee: Societe de Production et de Recherches Appliquees, Bois-Colombes, France

[21] Appl. No.: 09/011,455

[22] PCT Filed: Jul. 5, 1996

[86] PCT No.: PCT/FR96/01060

§ 371 Date: Jan. 22, 1998

§ 102(e) Date: Jan. 22, 1998

[87] PCT Pub. No.: WO97/07578

PCT Pub. Date: Feb. 27, 1997

[30] Foreign Application Priority Data

Aug. 11, 1995 [FR] France .................................. 95 09780

[51] Int. Cl.[7] .................................................. H01S 3/082
[52] U.S. Cl. .................................. 372/97; 372/23; 372/68; 219/121.61
[58] Field of Search ...................... 372/9, 20, 23, 372/68, 92, 97, 108; 219/121.6, 121.61

[56] References Cited

U.S. PATENT DOCUMENTS

| | | | |
|---|---|---|---|
| 4,648,092 | 3/1987 | Ewbank et al. | 372/97 X |
| 4,649,351 | 3/1987 | Veldkamp et al. | 372/97 X |
| 5,253,110 | 10/1993 | Ichihara et al. | 359/619 |
| 5,293,389 | 3/1994 | Yano et al. | 372/30 |
| 5,307,369 | 4/1994 | Kimberlin | 372/108 |
| 5,375,132 | 12/1994 | Connors et al. | 372/97 X |
| 5,737,347 | 4/1998 | Scheps et al. | 372/23 |
| 5,886,313 | 3/1999 | Krause et al. | 219/121.6 |

FOREIGN PATENT DOCUMENTS

| | | |
|---|---|---|
| 0308512 | 3/1989 | European Pat. Off. . |
| 0511805 | 11/1992 | European Pat. Off. . |
| 2737806 | 2/1997 | France . |
| 9509778 | 2/1997 | France . |
| 4009859 | 10/1991 | Germany . |
| 4301689 | 7/1994 | Germany . |
| 01302881 | 12/1989 | Japan . |
| WO9417953 | 8/1994 | WIPO . |
| WO9426459 | 11/1994 | WIPO . |

OTHER PUBLICATIONS

NTIS Tech Notes, No. 8B, Aug. 1996, Springfield, VA, US, XP002012655; J.B. Laudenslager et al.: Timed Multiple–Laser Array. (from NASA Tech Brief–2 pages).

Journal of Applied Physics, vol. 71, No. 1, Jan. 1, 1992, New York, US, pp. 85–93, XP000270254; D. Xenakis et al.: Laser–Plasma X–Ray Generation Using an Injection–Mode– Locked XeC1 Excimer Laser.

Optics Letters, vol. 14, No. 7, Apr. 1989, Washington, US, pp. 364–366, XP000052032; M.D. Dawson et al.: Wavelength–Tunable Synchronous Amplification of Picosecond Dye–Laser Pulses Near 1um.

*Primary Examiner*—John D. Lee
*Attorney, Agent, or Firm*—Christie, Parker & Hale, LLP

[57] ABSTRACT

A laser source has two or more laser units and coupling means for coupling the laser beams from each unit so as to deliver a resulting beam for treating a surface. Concurrently with the laser surface treatment, the characteristics of the laser beam from each unit are adjusted to produce a resulting laser beam with a time profile of energy optimally adapted to said laser surface treatment. Homogenizing means homogenize the energy distribution of the resulting laser beam, so that the energy and spatial distribution of said resulting laser beam are concurrently adapted for the selected surface treatment.

25 Claims, 5 Drawing Sheets

DEVICE FOR CONTROLLING A LASER SOURCE WITH MULTIPLE LASER UNITS FOR THE ENERGY AND SPATIAL OPTIMIZATION OF A LASER SURFACE TREATMENT

BACKGROUND OF THE INVENTION

The present invention concerns the control of a laser source with multiple laser units for the energy and spatial optimization of a laser surface treatment.

It finds a general application in laser surface treatment, such as descaling, cleaning, polishing and preparing a surface. More particularly it finds application in the annealing, by excimer laser, of layers of amorphous silicon placed on a substrate.

In general terms, the annealing of amorphous silicon by excimer laser consists of raising the temperature of the layer of amorphous silicon very rapidly to the melting point in order to obtain crystallization in the form of a polysilicon. The melting of the layer of silicon must not for all that disturb the standard glass substrate too significantly.

In practice, the heating effect is due to the optical absorption of the laser beam by a thin film of amorphous silicon, for example over a thickness of less than 30 nm.

Annealing amorphous silicon by excimer laser requires excellent knowledge of the structural characteristics of the sample to be treated, as described at least partly in the patent application entitled "Device and method of controlling laser surface treatment", filed in France by the Applicant, on Aug. 11, 1995, under the number 95 09778, the content of which forms an integral part of the present application for all useful purposes.

First, heating by laser must be effective since it greatly influences the thermal change in the sample, notably with regard to the melting of the layer of silicon, which must be complete, and with regard to the melting of the substrate, which must be avoided.

Secondly, the speed of cooling and solidification of the layer of silicon must be relatively slow since it determines the size of the polysilicon grains present in the layer after annealing, since the large crystals are the most favourable to optimum functioning, for certain microelectronic devices based on silicon.

Applicant has observed that such an optimum treatment, from an energy and spatial point of view, is difficult to obtain using a single laser source.

Applicant therefore, proposes to use a laser source comprising at least two laser units.

However, the control of a laser source with several units, in combination with the laser surface treatment is, in its turn, difficult to implement.

The present invention affords a solution to this problem.

SUMMARY OF THE INVENTION

The object is a device for controlling a laser source comprising at least two laser units and coupling means suitable for coupling the laser beams coming from each unit in order to deliver a resulting laser beam intended for surface treatment.

According to a general definition of the invention, provision is made, in combination with the laser surface treatment, to regulate the characteristics of the laser beams coming from each laser unit in order to obtain a resulting laser beam with a time profile of energy adapted optimally to the said laser surface treatment, and homogenizing means suitable for spatially homogenizing the energy distribution of the resulting laser beam, which makes it possible to adapt in combination the spatial and energy distribution of the resulting laser beam to the chosen surface treatment. The resulting laser beam means a beam consisting of a plurality of initial laser beams.

In practice, in the application consisting of the annealing of amorphous silicon by excimer laser, the time profile of the power of the resulting laser beam comprises a steep rising edge for improving the efficacy of the heating, a substantially flat peak corresponding to a depth of treatment, chosen so as to obtain a complete melting of the layer of amorphous silicon to the said depth, while avoiding the melting of the substrate, and a gentle falling edge for promoting recrystallization.

DESCRIPTION OF THE DRAWINGS

Other characteristics and advantages of the invention will emerge in the light of the following detailed description and the drawings in which:

FIG. 6b depicts schematically the depth of melting as a function of the treatment time for the two laser time profiles of FIG. 6a.

DETAILED DESCRIPTION OF THE INVENTION

The description is based, nonlimitatively, on a particular application of the present invention which concerns the manufacture of active matrix liquid crystal screens, also called AMLCD, standing for "Active Matrix Liquid Crystal Display", and, more precisely, the step which consists of manufacturing polysilicon transistors (Polysilicon Thin Film Transistor, TFT), necessary both for producing the control circuits for the screen and for the display elements.

This technique consists of exploiting the particularly strong absorption of silicon in the ultraviolet region, whereas the glass of the substrate is completely transparent to the same wavelengths. A pulsed laser beam of high power makes it possible to raise the temperature of the amorphous silicon layer selectively to the melting point, without affecting the substrate.

The method has the advantage of being able to be very fast (the mean duration of one pulse of a 308 nm excimer laser is only 150 ns). In order to ensure homogenous treatment of large surfaces, it is necessary to use a high-power excimer laser, for example an excimer laser with reionization by X-ray providing an effective power of 1 kW (that is to say 10 J×100 Hz or 13 J×80 Hz).

This type of laser advantageously gives a high-power laser beam, pulsed with a relatively low repetition rate, which allows treatment over a large surface area, even up to the whole of each panel, in a single laser pulse.

Figure 1:
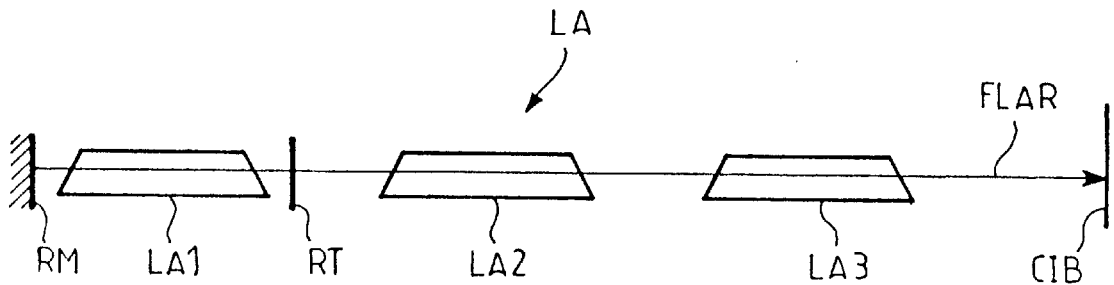
FIG. 1 schematically a laser source comprising three laser units mounted in series.

In FIG. 1, the device implementing the annealing process comprises a laser source LA having a power supply (not shown) and a plurality of excimer laser units shown individually at LA1 to LA3. The laser units, of high power, are positioned and interconnected so as to produce a single laser beam of very high power, for example 45 J.

In FIG. 1, the three laser heads are mounted in series.

The laser source LA1 constitutes a laser oscillator. Conventionally, this laser oscillator has:

an active laser material or medium capable of amplifying an incident wave;

optical pumping means (not shown) which gives the medium energy suitable for populating at least one of its excitation levels, in order to achieve a population inversion in the active medium; and an optical resonator, composed of two mirrors disposed face-to-face, which accumulate the induced emission concentrated on a few modes of the resonator.

In the case of a laser oscillator, one of the mirrors has a maximum reflection. This mirror is designated by the reference RM. Diametrically opposed to this, the mirror RT is semireflecting.

The mirror RM can be a simple maximum-reflection mirror. As a variant (FIGS. 1 and 2), it can be produced in the form of a corner of a cube, a trirectangular dihedron or a dihedron whose function, in addition to maximum reflection, is to make symmetrical the energy and spatial distribution of the laser beam with respect to the optical axis of the corner of a cube or the like. This laser beam thus made symmetrical can constitute a significant advantage in the spatial and energy distribution of the resulting laser beam, which will be described in more detail below.

After this oscillator LA1, there are two laser amplifier units LA2 and LA3 mounted in series. These amplifier units have no mirrors RM and RT. These units amplify the power of the beam which they receive.

The reflection of the mirror RM of the oscillator is at a maximum at the wavelength of the excimer laser, here 308 nm. The exit mirror RT of the oscillator LA1 has a coefficient of reflection of around 4 to 40%.

The dimensions of the laser units LA1 to LA3 are approximately as follows.

|  | LA1 | LA2 | LA3 |
| --- | --- | --- | --- |
| Example 1 | 0.5 | 0.5 | 1 |
| Example 2 | 0.5 | 1 | 1 |
| Example 3 | 1 | 1 | 1 |
| Example 4 | 1 | 1.5 | 1.5 |
| Example 5 | 1.5 | 1.5 | 1.5 |

The distances between units take account of the cavity lengths, and the durations of the laser pulses, in order to avoid:

a) any damage to the mirrors and to the windows, b) auto-absorption of the laser beam.

The drawback of such a source is its bulk. This is because putting the different units in series in such a way requires an installation of large size.

One solution (FIG. 2) consists of using reflective mirrors and focusing lenses for reducing the bulk of such a laser source.

The units LA1, LA2 and LA3 described previously are found here once again.

Figure 2:
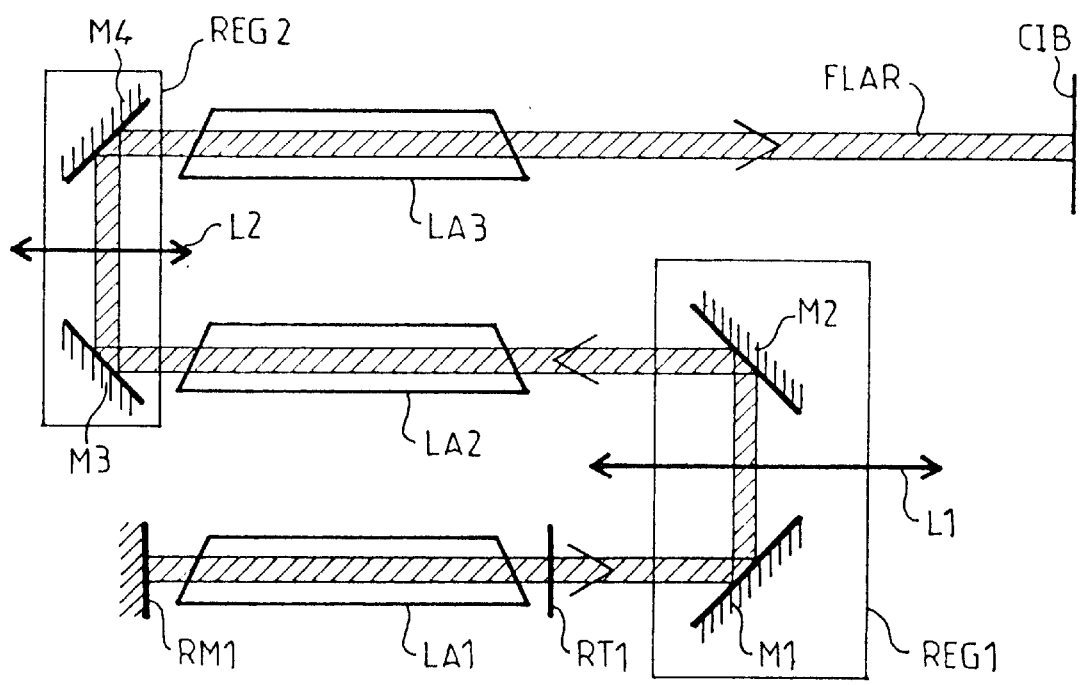
FIG. 2 depicts schematically a laser source comprising three laser units mounted in series with reflecting mirrors and focusing lenses.

FIG. 2 is distinguished from FIG. 1 by the fact of using reflective mirrors M1, M2, M3 and M4 for routing the resulting laser beam onto the target CIB.

Focusing lenses L1 and L2 are also disposed in order to focus the wave between the source LA1 and LA2 for the lens L1, and between the source LA2 and the source LA3 for the lens L2.

According to the invention, regulation mechanisms REG 1 between the source LA1 and LA2, and between the source LA2 and LA3, are provided for adjusting the distance between these two units according to the desired laser time profile, which will be described in more detail below.

According to the invention, the choice of the lengths of the different units and the distances between the different units mounted in series makes it possible to regulate the energy delivered by the resulting laser beam FLAR intended to be applied to the sample to be treated at the plane CIB.

For example, the regulation mechanisms REG 1 and REG 2 are means suitable for moving the optical elements M1, L1, M2 and M3, L2, M4 along the optical axis of the laser beam. They make it possible, by translational movement parallel to the axes of the incident and emergent beams, to vary the length of the optical path between LA1 and LA2 for REG 1, and between LA2 and LA3 for REG 2.

Figure 3:
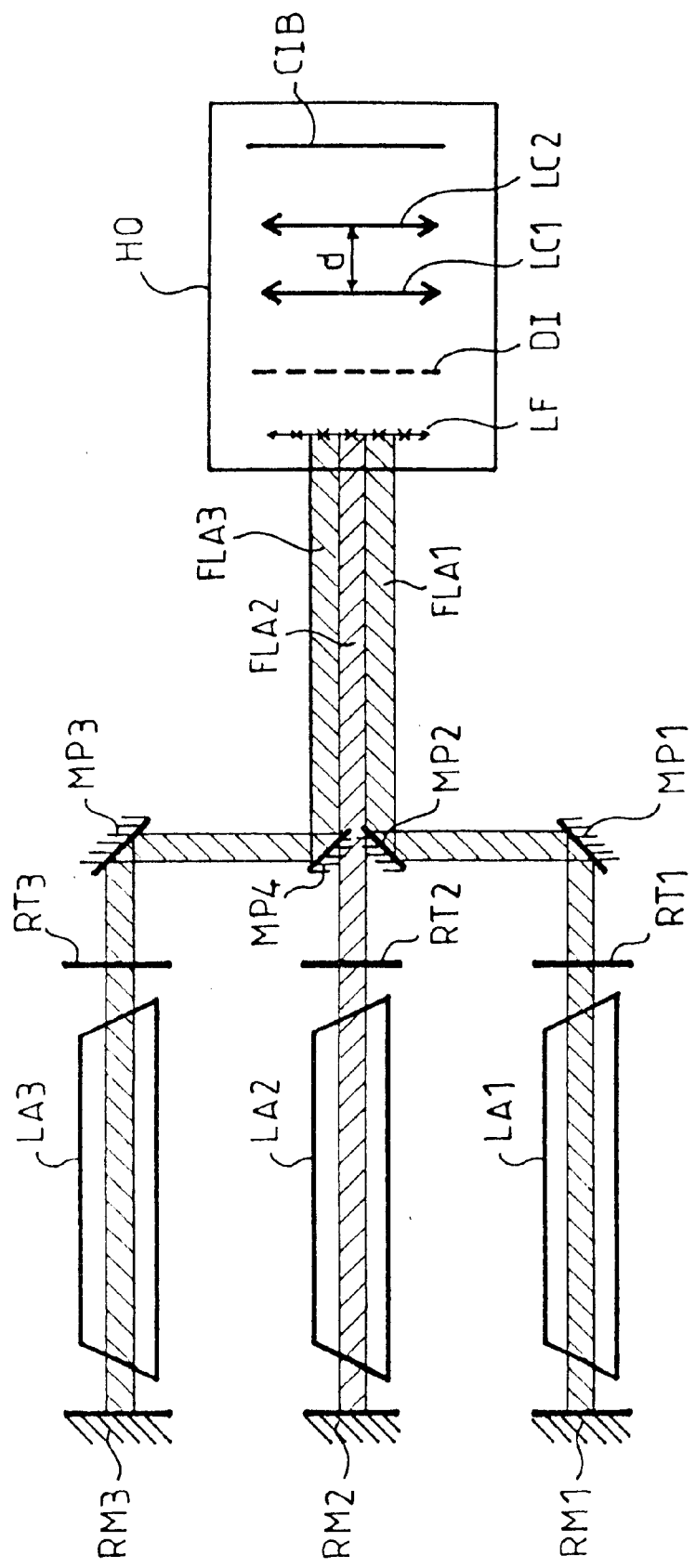
FIG. 3 depicts schematically a laser source comprising three amplifying laser units mounted in parallel.

As a variant, with reference to FIG. 3, the laser units can be put in parallel. Thus the three laser units LA1 to LA3 described previously are found once again. These all here fulfill the role of an oscillator, with each one a maximum reflecting mirror RM and a partial reflecting mirror RT. Coupling means formed by reflective mirrors MP1, MP2, MP3 and MP4 make it possible to couple the pulsed laser beams FLA1, FLA2 and FL3 coming from each oscillator towards the target plane CIB.

Advantageously, a homogenizer HO is provided for homogenizing the laser beams coming from each unit.

The homogenizer is preferably the one described in the application filed by the Applicant for "Optical device for homogenising a laser beam", the same date as the present patent application, and whose content, for all useful purposes, forms an integral part of the present application.

In general terms, the homogenizing device HO comprises:

a plurality of m.n front lenses LF which are convergent and contiguous, disposed in m rows and n columns, perpendicularly to the direction of propagation of the laser beams coming from each laser unit, and able to divide the laser beams to be processed into m.n laser beams each having a substantially uniform transverse section, and a substantially homogenous energy distribution; and at least one convergent collection lens LC, disposed perpendicularly to the direction of propagation of the laser beams to be processed, downstream of the front lenses LF in the direction of travel of the laser beam, the said collection lens being suitable for focusing, in a chosen plane CIB, the beams coming from the front lenses.

The homogenizing device HO preferably comprises two collection lenses LC1 and LC2 able to move in translation along the optical axis, the distance d between the two lenses being chosen in order to adapt, according to the invention, the size and energy of the resulting laser beam FLAR to the chosen application.

Advantageously, the combination of the collection lenses LC1 and LC2 is calculated so as to minimize any optical abberations of the laser source coupled with the homogenizing means and so as to improve the energy characteristics per unit surface (consistency of the flux of the resulting laser beam).

Figure 4:
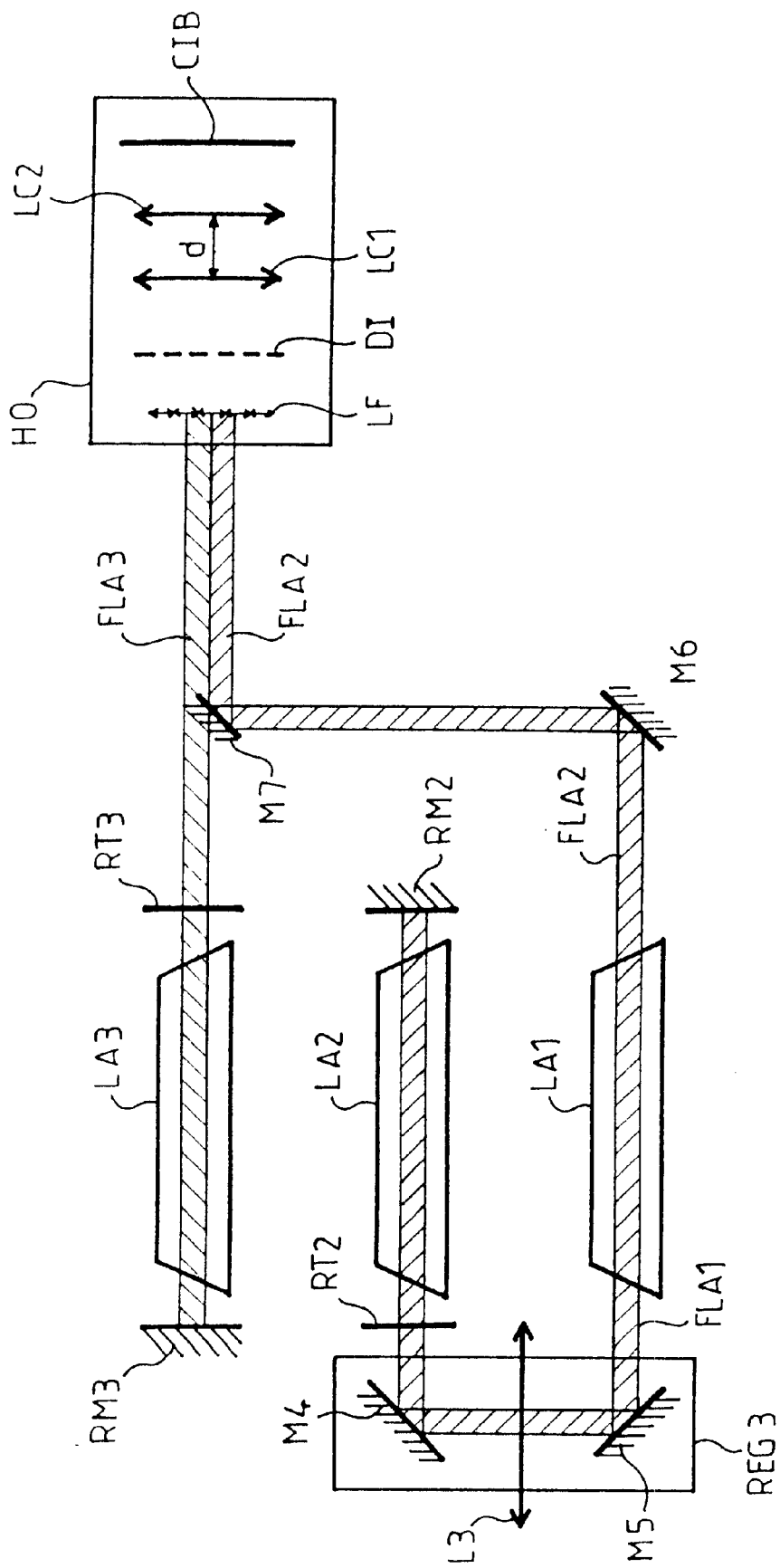
FIG. 4 depicts schematically a laser source with two oscillating laser units mounted in parallel, one of the oscillators being associated in addition with an amplifying unit.

In FIG. 4, a variant of the laser source is depicted. The laser units LA1, LA2 and LA3 previously described are found once again.

Compared with FIG. 3, the unit LA1 here fulfills the role of an amplifier instead of fulfilling the role of an oscillator as described with reference to FIG. 3. The units LA2 and LA1 are here put in series in order to deliver a pulsed resulting laser beam FLA2 designed to be routed towards the target plane CIB.

The homogenizer HO is designed to homogenize the laser beams coming from the unit LA3 delivering the laser beam FLA3 and the laser beam FLA2 coming from the units LA2 and LA1 put in series.

A regulation mechanism REG3 is provided between the unit LA2 and the unit LA1 in order to adjust the distance between the two units. Reflecting mirrors M4, M5, M6 and M7 route the laser beam FLA2 coming from the unit LA2 toward the unit LA1 and then the laser beam FLA1 towards the target CIB.

A focusing lens L3 is advantageously associated with the regulation mechanism REG3 in order to focus the laser beam as a function of the movement of the optical elements.

Figure 5:
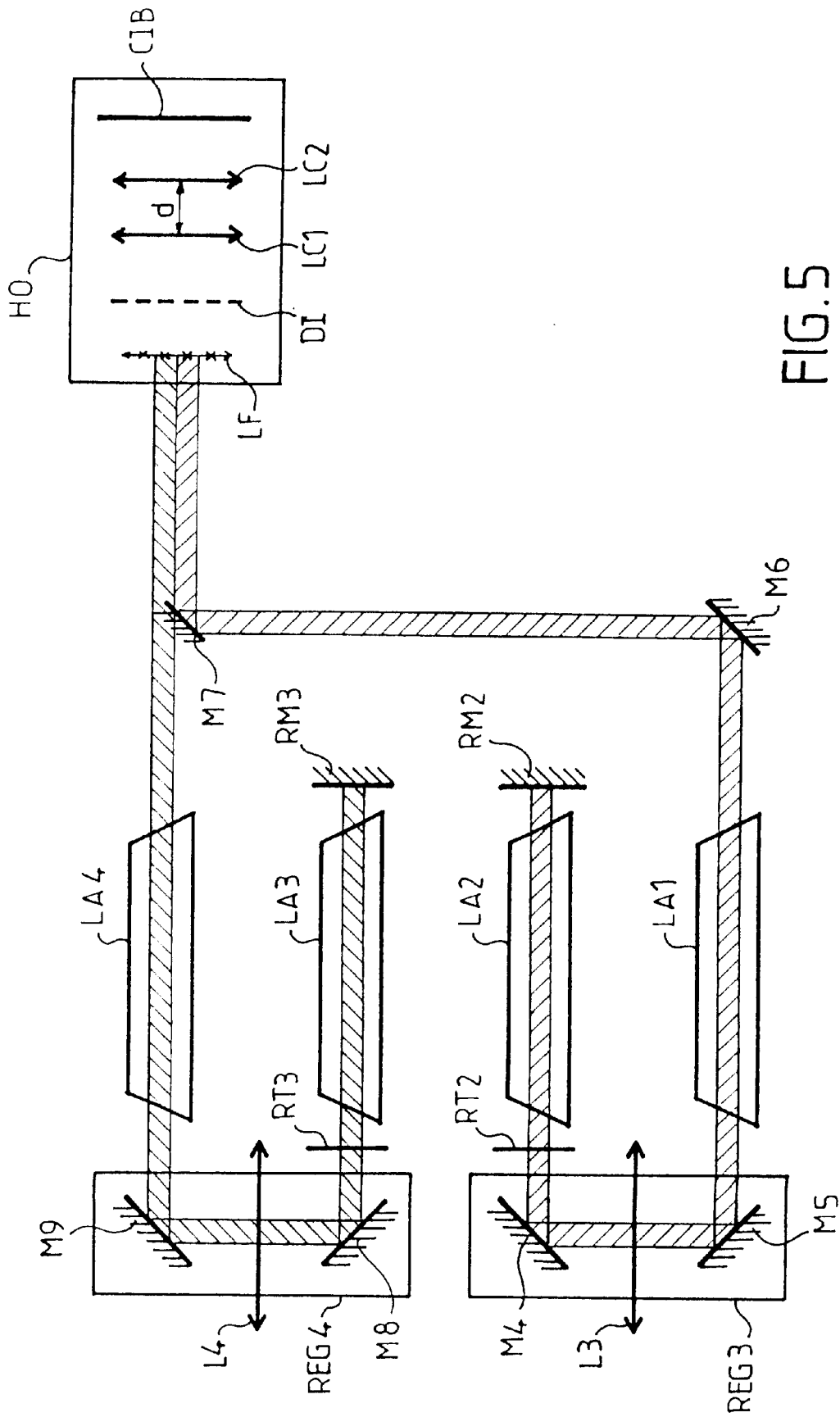
FIG. 5 depicts schematically a laser source with two oscillating laser units mounted in parallel, each oscillating unit also being associated with an amplifying unit.

FIG. 5 depicts a laser source with four laser units. Such an installation is symmetrical. It is distinguished from the one described with reference to FIG. 4 in that it comprises an additional amplifying laser unit LA4 put in series with the oscillating laser unit LA3 of FIG. 4.

In the application consisting of the annealing of amorphous silicon for the manufacture of liquid crystal screens of large size, each panel has dimensions of around 550×650 mm. The resulting laser beam has a dimension adapted to the size of the panels to be treated.

Figure 6A:
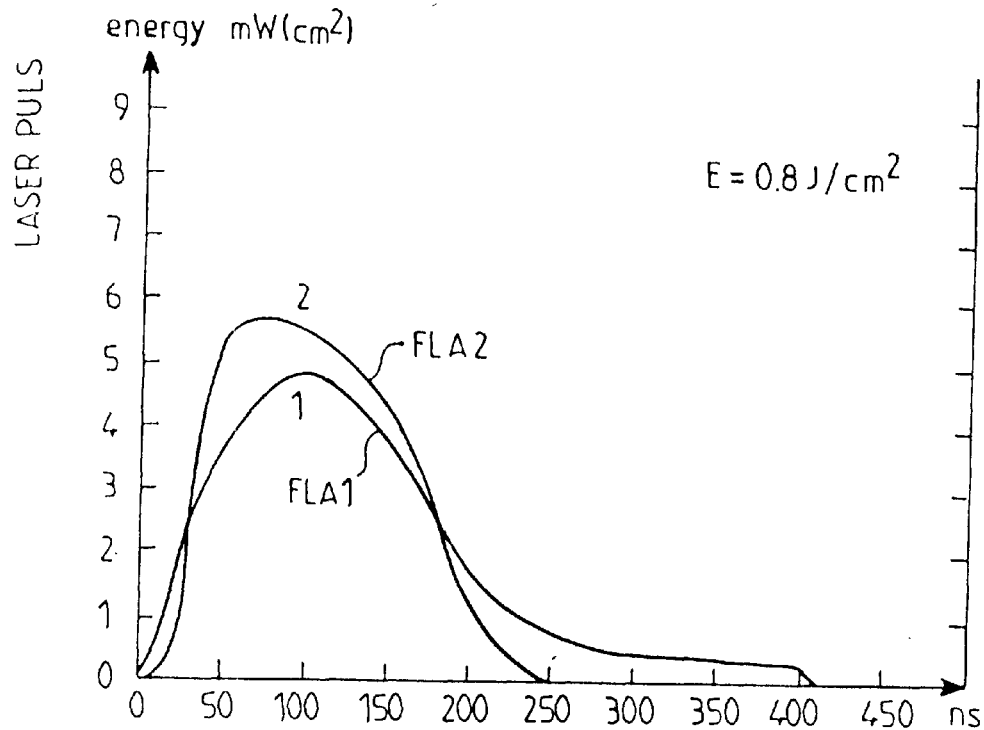
FIG. 6a depicts schematically the time profiles of two laser beams each coming from a unit.

FIG. 6a depicts two time profiles of the energy delivered by two laser beams, each coming from a laser unit. The total energy of each beam is $0.8 \text{ J/cm}^2$. The energy in $\text{mW/cm}^2$ is shown on the Y-axis while the time in ns is shown on the X-axis. This is a case of two profiles relating to two different laser beams. It can be seen for example that the laser beam FLA2 delivers a high energy more rapidly than the laser beam FLA1.

Figure 6B:
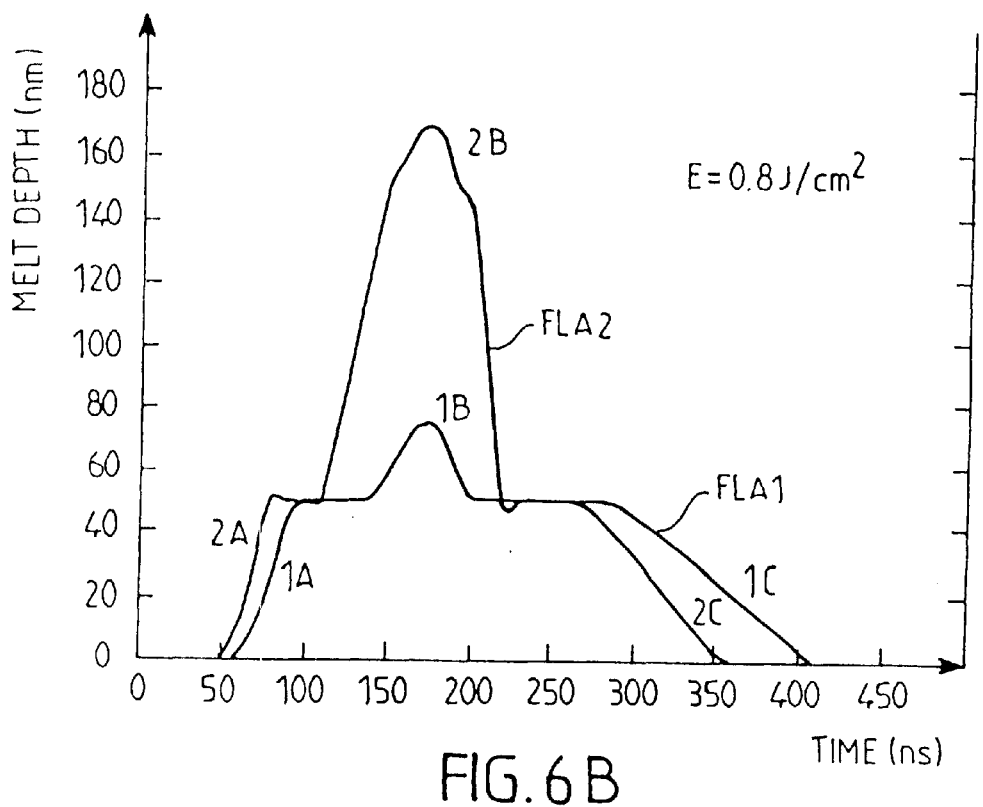

FIG. 6b depicts the thickness of the layer melted over time by the two laser beams FLA1 and FLA2 described with reference to FIG. 6a.

It is found that the laser beam FLA2 comprises a power rise edge 2a which is steeper than the one 1a of the laser beam FLA1.

It can also be seen that the laser beam FLA1 comprises a power peak 1b which is substantially flatter, at a depth of 50 nm, than that 2b of the laser beam FLA2. For example, the depth of 50 nm corresponds to the thickness of the amorphous silicon layer to be annealed by laser.

Finally it is found that the laser beam FLA1 comprises a power fall edge 1c which is substantially more gentle than that 2c of laser beam FLA2.

In the application consisting of the annealing of amorphous silicon by excimer laser, the time profile of the desired resulting laser beam comprises a power rise edge which is substantially steeper in order to improve the efficacy of the heating, a power peak which is substantially flat at a treatment depth chosen so as to obtain a total melting of the layer of amorphous silicon at the said depth while avoiding melting of the substrate, and a power fall edge which is substantially gentle in order to promote growth of the crystals.

According to the invention, the laser beams coming from each laser unit are regulated in order to obtain a resulting laser beam having such a time profile.

For example, the regulation means comprise triggering means able to trigger the laser oscillator units with a chosen time shift.

Another solution according to the invention consists of adjusting the lengths of the units and the distances between the different units in order to obtain a resulting laser beam exhibiting a time profile adapted to the surface treatment. For example, a profile as previously described.

Another solution according to the invention consists of varying the energy used by each individual laser unit so that the resulting laser beam represents the chosen profile. The variation means can be optical means (diaphragms) and/or mechanical means.

Another solution according to the invention consists of adjusting the distance d between the two focusing lenses of the homogenizer described above.

We claim:

1. A device for controlling a laser source, comprising at least two laser units and coupling means able to couple the laser beams coming from each unit in order to deliver a resulting laser beam intended for the treatment of a surface, wherein the said device also comprises, in combination with the laser surface treatment:
    adjustment means (REG) able to adjust the characteristics of the laser beams coming from each unit in order to obtain a resulting laser beam with a time profile of energy optimally adapted to the said laser surface treatment, and
    homogenizing means (HO) able to spatially homogenize the energy distribution of the said resulting laser beam, which makes it possible to adapt, in combination, the spatial and energy distribution of the said resulting laser beam to the chosen surface treatment.

2. A device as claimed in claim 1, wherein the adjustment means are able to obtain a time profile of the energy of the resulting laser beam with a substantially steep power rise edge, a substantially flat power peak at a chosen treatment depth and a substantially gentle power fall edge.

3. A device as claimed in claim 1 or claim 2, wherein the adjustment means comprise means able to optically and/or mechanically vary the energy delivered by each laser unit.

4. A device as claimed in claim 1 or claim 2, wherein the adjustment means comprise regulation means able to regulate the optical and/or geometric characteristics of the laser beams coming from each laser unit.

5. A device as claimed in claim 1, wherein the laser source comprises at least one laser amplifying unit and an oscillating unit mounted in series.

6. A device as claimed in claim 5, wherein the laser oscillating unit comprises a total reflection mirror (RM) arranged as a corner of a cube or similar in order to make the laser beam symmetrical with respect to the optical axis of the said laser beam, and contribute to the homogenisation of the resulting laser beam.

7. A device as claimed in claim 5, wherein the adjustment means comprise regulation means (REG) able to regulate the length of the laser units, as well as the distance between the amplifying and oscillating units and the laser energy to be applied.

8. A device as claimed in claim 5, wherein the laser source comprises at least two laser oscillating units and the adjustment means comprise triggering means able to trigger the at least two laser oscillating units with a chosen time shift.

9. A device as claimed in claim 1, wherein the laser source comprises at least two laser oscillating units mounted in parallel.

10. A device as claimed in claim 9, wherein the adjustment means comprise triggering means able to trigger the at least two laser oscillating units with a chosen time shift.

11. A device as claimed in claim 1, wherein the homogenizing means (HO) comprises:

- a plurality of m.n front lenses (LF) which are convergent and contiguous, disposed in m rows and n columns, perpendicularly to the direction of propagation of laser beams coming from each laser unit, and able to divide the laser beams to be processed into p.q laser beams each having a substantially uniform transverse section, and a substantially homogenous energy distribution, p.q being a sub-multiple of m.n,
- at least one convergent collection lens (LC), disposed perpendicularly to a direction of propagation of the laser beams to be processed, downstream from the front lenses in the direction of travel of the laser beam, said at least one collection lens being suitable for focusing, in a chosen plane (CIB), the beams coming from the front lenses.

12. A device as claimed in claim 11, wherein said device comprises two collection lenses (LC1 and LC2) able to move in translation along the optical axis, the distance (d) between the two lenses being chosen so as to adapt the size and energy of the resulting laser beam to the chosen application and the combination of the said collection lenses (LC1 and LC2) being able to be calculated so as to minimize any optical aberrations of the laser source coupled with the homogenizing means and to improve the energy characteristics per unit surface of the resulting laser beam.

13. A device as claimed in one of claims 1, 2 and 5 through 12, wherein the surface treatment is an annealing of a semiconductor material of the amorphous silicon type.

14. A controllable laser source for treating a surface, comprising:

- a laser source having at least two laser units coupled together to deliver a resulting laser beam for treating said surface;
- a regulator for adjusting laser beam characteristics from each of the laser units such that said resulting laser beam comprises a time profile of energy adapted for said surface treatment; and
- a homogenizing optical device for spatially homogenizing energy distribution of said resulting laser beam such that the spatial and energy distribution of the said resulting laser beam is adapted to a chosen surface treatment.

15. A device as claimed in claim 14, wherein the time profile of the energy of the resulting laser beam comprises a rising power edge, substantially flat power peak at a chosen treatment depth and a falling power edge, wherein said rising power edge is steeper than said falling power edge.

16. A device as claimed in claim 14 or claim 15, wherein the laser beam characteristics comprise energy, and the regulator optically or mechanically varies the energy delivered by each laser unit.

17. A device as claimed in claim 14 or claim 15, wherein the laser beam characteristics comprise optical or geometric characteristics.

18. A device as claimed in claim 14, wherein the laser source comprises at least one laser amplifying unit and an oscillating unit mounted in series.

19. A device as claimed in claim 18, wherein the laser oscillating unit comprises a total reflection mirror arranged as a corner of a cube to make a symmetrical laser beam with respect to an optical axis homogenization of the resulting laser beam.

20. A device as claimed in claim 18, wherein the regulator regulates a length of each of the laser units, a distance between the laser units and laser energy from each of the laser units.

21. A device as claimed in claim 14, wherein the laser source comprises two laser oscillating units, and the regulator comprises a trigger for triggering the two laser oscillating units at different times.

22. A device as claimed in claim 14, wherein the laser source comprises at least two laser oscillating units mounted in parallel.

23. A device as claimed in claim 22, wherein the regulator comprises a trigger for triggering the two laser oscillating units at different times with a chosen time shift.

24. A device as claimed in claim 14, wherein the homogenizing optical device comprises:

- a plurality of convergent and contiguous front lenses disposed perpendicularly to the direction of propagation of the resultant laser beam, said front lenses being able to divide the resultant laser beam into a plurality of laser beams each having a substantially uniform transverse section, and a substantially homogenous energy distribution, said plurality of laser beams being a submultiple of said plurality of front lenses; and
- at least one convergent collection lens disposed perpendicularly to a direction of propagation of said plurality of laser beams downstream from the front lenses, said at least one collection lens being suitable for focusing, in a chosen plane, said plurality of laser beams coming from the front lenses.

25. A device as claimed in claim 24, wherein said at least one lens comprises two collection lenses moveable in translation along an optical axis, the size and energy of the resultant laser beam being a function of a distance between the two lenses whereby the combination of the collection lenses reduces optical aberrations of the laser source coupled with the homogenizing optical device and improves energy characteristics per unit surface of the resulting laser beam.

* * * * *